US006758062B2

(12) United States Patent
Watanabe et al.

(10) Patent No.: US 6,758,062 B2
(45) Date of Patent: Jul. 6, 2004

(54) PLASMA DISPLAY PANEL PRODUCTION METHOD

(75) Inventors: Taku Watanabe, Katano (JP); Masaki Aoki, Minoo (JP); Shigeo Suzuki, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 398 days.

(21) Appl. No.: 09/890,499

(22) PCT Filed: Dec. 7, 2000

(86) PCT No.: PCT/JP00/08659

§ 371 (c)(1),
(2), (4) Date: Aug. 1, 2001

(87) PCT Pub. No.: WO01/43158

PCT Pub. Date: Jun. 14, 2001

(65) Prior Publication Data

US 2002/0139144 A1 Oct. 3, 2002

(30) Foreign Application Priority Data

Dec. 8, 1999 (JP) .......................................... 11-348931

(51) Int. Cl.[7] ................................................ C03B 19/10
(52) U.S. Cl. ........................... 65/17.3; 65/21.3; 65/21.5
(58) Field of Search ................................ 65/17.3, 21.3, 65/21.5

(56) References Cited

U.S. PATENT DOCUMENTS 4,715,878 A * 12/1987 Kopatz et al. ............... 65/21.1
4,781,741 A * 11/1988 Johnson et al. .............. 65/21.2
4,816,067 A * 3/1989 Kopatz et al. ................ 75/342
4,961,770 A * 10/1990 Johnson et al. .............. 65/21.3
5,124,091 A * 6/1992 Paliwal et al. ................ 264/15
6,010,973 A 1/2000 Watanabe et al. ............. 501/20

FOREIGN PATENT DOCUMENTS

| | | |
|---|---|---|
| EP | 0957502 | 5/1999 |
| JP | 11-106237 | 4/1999 |
| JP | 11-167861 | 6/1999 |
| JP | 11-329254 | 11/1999 |

* cited by examiner

*Primary Examiner*—Sean Vincent

(57) ABSTRACT

The present invention intends to provide a manufacturing method for a plasma display panel, so as to overcome problems associated with a withstanding voltage of a dielectric glass layer. Glass particles have angular shapes after grinding with a grinder, but as the surface of them has been melted, they are converted into spheroids. Those glass particles can get wet evenly, so that a binder evenly adheres to the surface of a glass particle when a glass paste including the glass particles is applied to the surface of a substrate. In this case, there is a scarce possibility for a gas, generated by baking the binder, to remain in the form of bubbles in a formed dielectric glass layer. There are fewer bubbles remaining in a completed dielectric glass layer than in a dielectric glass layer than in a glass layer made from angular glass particles.

13 Claims, 7 Drawing Sheets

62
61

AH 63
64

AH

PLASMA DISPLAY PANEL PRODUCTION METHOD

TECHNICAL FIELD

The present invention relates to a manufacturing method of a plasma display panel used for display devices and the like, and especially relates to a manufacturing method of a plasma display panel with an improved dielectric glass layer.

BACKGROUND ART

In recent years, there have been high expectations for high-quality large screen televisions such as high-definition televisions (HDTV). As a display panel for such televisions, cathode ray tubes (CRTs), liquid crystal displays (LCDs), and plasma display panels (PDPs) have been used. Although CRTs have superior resolution and picture quality to those of PDPs and LCDs, they are unsuited for large-screens of 40 inches or more in terms of depth and weight. LCDs, meanwhile, have low power consumption and low drive voltages, but their screen size and viewing angle are limited. On the other hand, PDPs enable large screen televisions to be produced, with models in the 40-inch range having been already developed (See "Kino Zairyo (Functional Materials)" February 1996. Vol.16, No.2, p.7).

FIG. 8 is a perspective view showing a conventional alternate current (AC) type PDP. As shown in FIG. 8, discharge electrodes 72 are formed on the surface of a front glass substrate 71 made of borosilicate sodium by a floating method. A dielectric glass layer 73 is formed so as to cover the discharge electrodes 72, and the surface of the dielectric glass layer 73 is covered with a magnesium oxide (MgO) dielectric protective layer 74. The dielectric glass layer 73, which serves as a condenser, is formed from glass particles having an average particle diameter of 2 to 15 μm.

Address electrodes 76 are formed on the surface of a back glass substrate 75, and a dielectric glass layer 77 is formed so as to cover the address electrodes 76. Barrier ribs 78 and phosphor layers 79 are formed on the surface of the dielectric glass layer 77. Spaces created between the barrier ribs 78 are discharge spaces 80, into which a discharge gas is enclosed.

A high-definition television that is fully compatible with the specification for Japanese "HiVision" broadcasts has achieved 1920×1125 pixels and expectations are growing for the television. The dot pitch of a 42-inch screen has a pixel pitch of 0.15 mm×0.48 mm, and the area of one cell is as small as 0.072 $mm^2$. The area is 7 or 8 times smaller than a 42-inch, high-definition television according to the conventional NTSC (640×480 pixels, a dot pitch of 0.43 mm×1.29 mm, and a cell area of 0.55 $mm^2$).

As a result, the panel luminance decreases for the high-definition television that is fully compatible with the specification for Japanese "HiVision" broadcasts (See "Display and Imaging" 1997, Vol. 6, pp. 70).

Furthermore, not only does the distance between discharge electrodes decrease, but also the discharge space becomes smaller. To provide the dielectric glass layers 73 and 77 without degrading their capacities as capacitors in a smaller cell area, it is necessary to make the dielectric glass layers 73 and 77 thinner.

There are mainly three conventional methods for forming dielectric glass layers.

According to the first method, a dielectric glass layer is formed using glass particles that have an average diameter of 2 to 15 μm and the softening point of 550 to 600° C. The glass particles are blended with a solvent such as terpineol containing ethyl cellulose or butyl carbitol acetate using three roles, and made into a glass paste. The glass paste is applied to the surface of a front glass substrate by screen-printing. Here, the viscosity of the glass particles has adjusted to 50,000 to 100,000 centipoises beforehand, which is suitable for screen-printing. The glass paste is then dried and fired at around the softening point of the glass particles (550 to 600° C.), thereby forming a dielectric glass layer.

In this method, the glass paste is baked at around its softening point. Since the glass does not flow well and is inactive at around the softening point, the melted glass particles hardly react with the electrodes of Ag, ITO, Cr—Cu—Cr, or the like. This prevents the resistance of electrodes from rising, or substances constituting the electrodes from dispersing into and staining the glass paste. Also, this method requires only one firing to form a dielectric glass layer. On the other hand, bubbles (pinholes) appear in the dielectric glass layer and lower the withstanding voltage of the layer in this method. Here, the withstanding voltage refers to a maximum voltage applicable to a dielectric glass layer before the glass layer is destroyed and insulating properties begins to degrade.

The second method uses low-melting lead glass particles that have an average diameter of 2 to 15 μm and the softening point of 450 to 500° C. (the proportion of PbO is about 75%). After the particles are made into a paste so as to have a viscosity of 35,000 to 50,000 centipoises, the glass paste is applied to a front glass substrate by screen-printing, dried and fired at 550 to 600° C., which is about 100° C. higher than the softening point of the glass particles. Since the firing temperature is much higher than the softening point, the glass paste flows well. As a result, a dielectric glass layer having a smooth surface (whose surface roughness is about 2 μm) can be obtained. Also, it requires only one firing to form the dielectric glass layer.

However, when the glass paste is activated and flows well, the molten glass particles are likely to react with the compositions of the electrodes such as Ag, ITO and Cr—Cu—Cr. As a result, the resistance of electrodes increases, and the dielectric glass layer is stained. Also, large bubbles tend to emerge in the formed dielectric glass layer.

The third method is the combination of the first and the second methods (See Japanese Laid-Open Patent Application No. 7-105855, and No. 9-50769). Which is to say, glass particles having an average diameter of 2 to 15 μm and the softening point at 550° C. to 600° C. are made into a paste and printed on the front glass substrate by screen-printing. The glass paste is then dried and fired at around its softening point. On the formed dielectric glass layer, another glass paste is applied by screen-printing, which is formed from glass particles whose diameter is in a range of 2 to 15 μm and softening point is at 450 to 500° C. The printed glass paste is then dried and fired at 550 to 600° C., which is 100° C. higher than the softening point, to form another dielectric glass layer.

Such a two-layer construction not only prevents the discharge electrodes from reacting with the glass paste, but also improves the withstanding voltage. However, the manufacturing process of a dielectric glass layer with a two-layer construction is complicated. Furthermore, it is difficult to form a thinner dielectric glass layer, which is necessary to improve panel luminance.

DISCLOSURE OF INVENTION

The present invention intends to provide a manufacturing method for a plasma display panel that can overcome the problems associated with the withstanding voltage of a dielectric glass layer.

To do this, the present invention provides a manufacturing method for a plasma display panel by which electrodes are formed on a surface of a substrate in a first process and a dielectric glass layer is formed on the electrodes in a second process, the second process comprising a grinding step of grinding a dielectric glass material; a spheroidizing step of converting each particle of the ground dielectric glass material into a spheroidal form; an applying step of applying a mixture of the spheroidal dielectric glass particles and a binder as a layer to the surface of the substrate on which the electrodes are formed; and a firing step of firing the layer to remove the binder from the layer, thereby forming a dielectric glass layer.

Since a binder used for screen-printing does not easily adhere to the conventional glass particles evenly, a binder applied to some of the glass particles in a large amount do not easily get fired and tend to remain there even after all the glass particles have melted down and a dielectric glass layer is completed. By contrast, a binder can be evenly applied to the surface of glass particles included in a dielectric glass layer, if the particles are converted from irregular-shaped ones into spheroids in the spheroidizing step. In the dielectric glass layer, the binder applied to the glass particles can be fired at almost the same speed and burn out entirely before the burning temperature reaches the softening point of the glass particles. Therefore, gas enclosed in a dielectric glass layer for firing the binder can get away from the layer. In this case, there is a scarce possibility for the gas to stay there in the form of bubbles. This causes an increase in a withstanding voltage of the dielectric glass layer.

In the spheroidizing step, the surface of the ground particles of the dielectric glass material is melted. By doing so, the glass particles are converted into spheroids.

During the melting, the particles of the ground glass material are exposed to a plasma jet. The plasma jet has an effect of melting the surface of the particles and converting them into spheroids.

At the same time, the particles of the ground dielectric glass materials are left in an atmosphere at a temperature of under the softening point of the glass particles. By doing so, the surface of the glass particles melts down and the particles are converted into spheroids.

The glass particles flowing in the plasma jet collide with each other at a high speed and are chipped off and polished, until at last each of the particles is converted into a spheroid.

Note that the second process further comprises a step of classifying the glass particles, which is performed between the spheroidizing step and the applying step, so that a maximum diameter of the spheroidal particles of the dielectric glass material does not exceed a half thickness of the dielectric glass layer after the firing step.

The applying step is performed by placing a dielectric glass sheet on the surface of the substrate, the dielectric glass sheet being obtained by mixing the spheroid glass particles and a thermoplastic resin.

Following those steps, a thinner dielectric glass layer can be achieved.

BEST MODE FOR CARRYING OUT THE INVENTION

The following describes a construction and a manufacturing method for a plasma display panel (hereafter referred to as a PDP) that are embodiments of the present invention, with reference to the attached figures. Note that the following embodiments are mere examples of the invention where dielectric glass particles after grinding are subjected to spheroidizing step, so that other manufacturing methods that produce the same effects as the present invention should be construed as being included in the scope of the present invention.

First Embodiment

Figure 1:
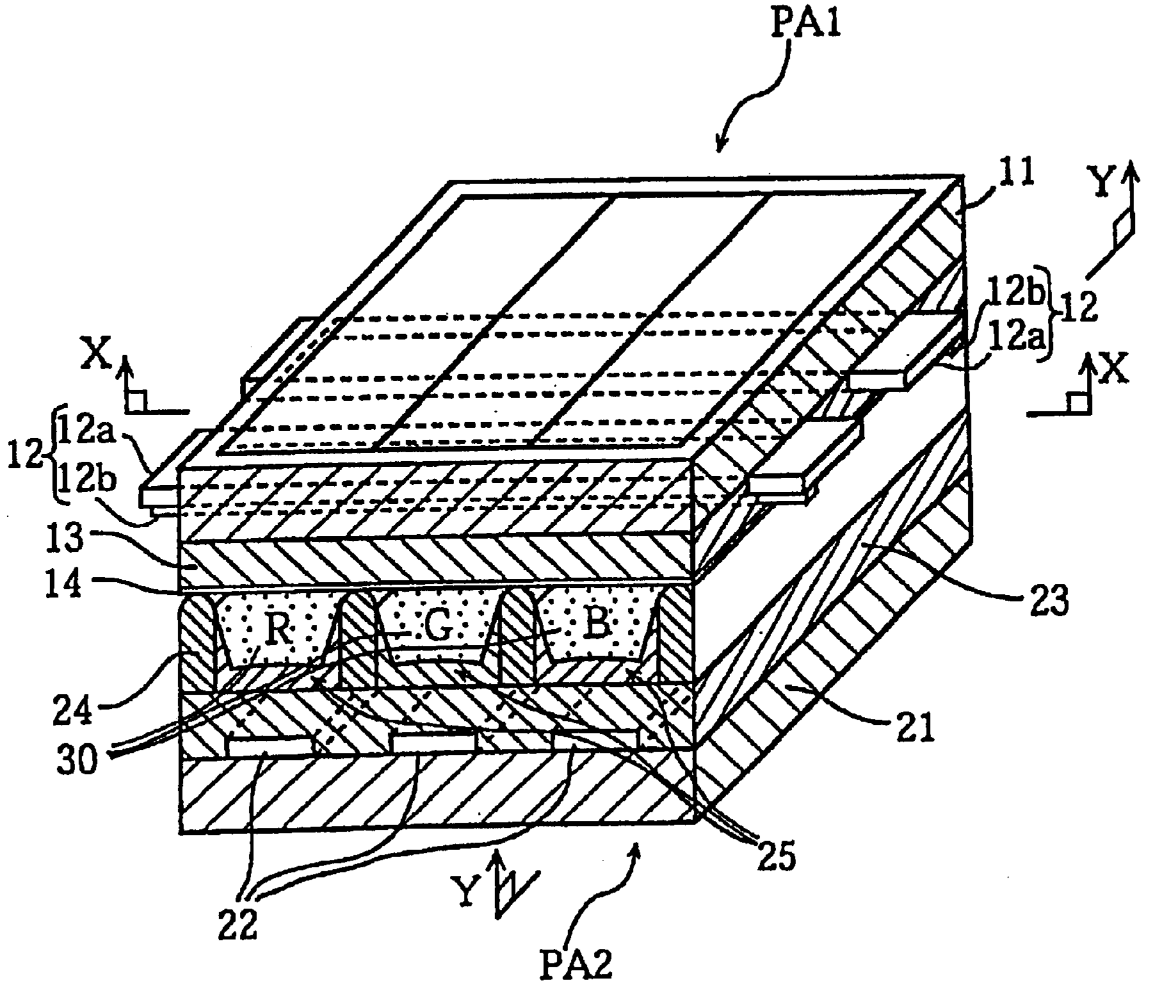
FIG. 1 is a perspective view showing an AC-type surface discharge PDP relating to an embodiment of the present invention.
Figure 2:
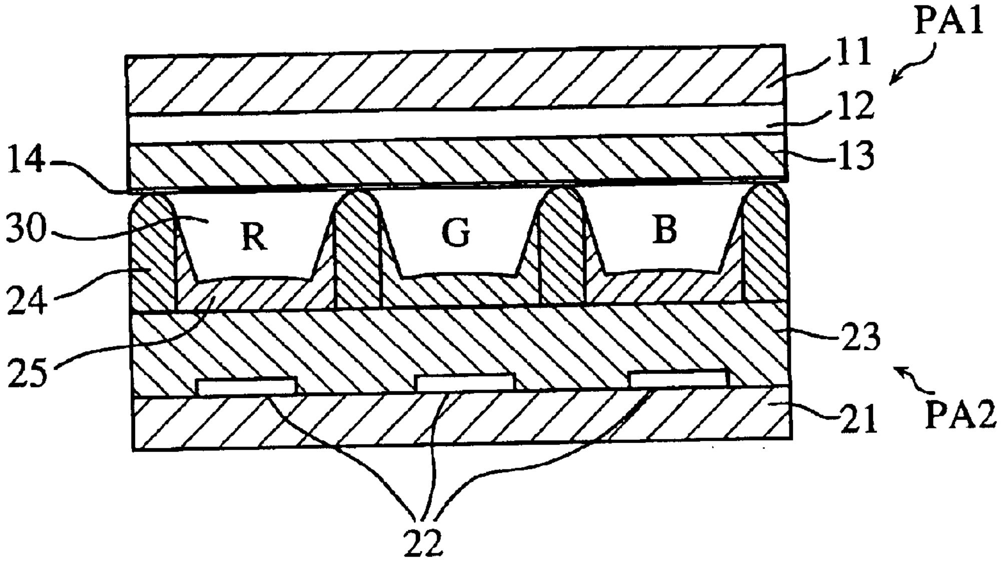
FIG. 2 is a longitudinal sectional view showing the PDP of FIG. 1 taken on the X—X line.
Figure 3:
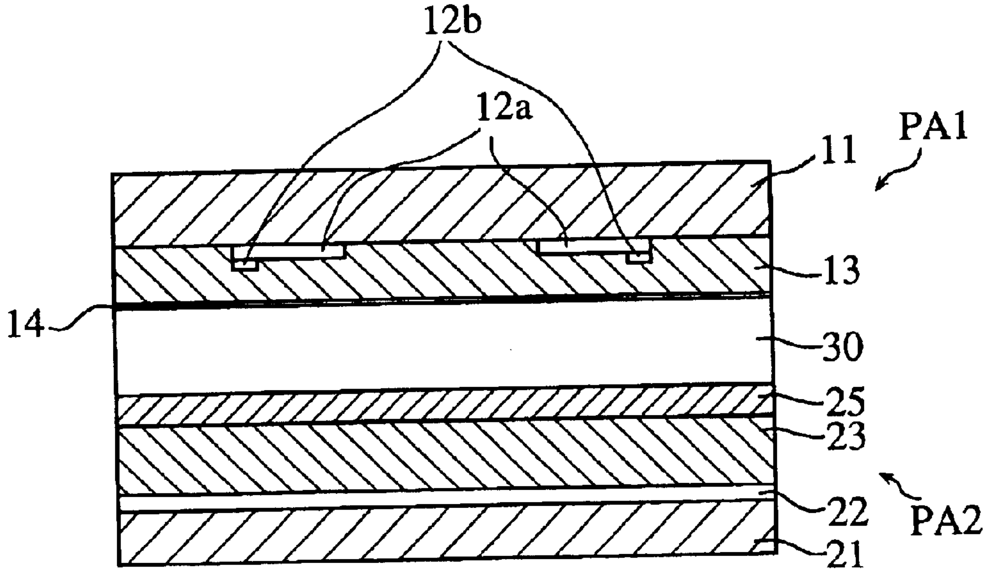
FIG. 3 is a longitudinal sectional view of the PDP of FIG. 1 taken on the Y—Y line.

FIG. 1 is a perspective view showing an AC-type surface discharge PDP relating to the embodiments of the present invention. FIG. 2 is a longitudinal sectional view of the PDP taken on the X—X line, and FIG. 3 shows a longitudinal sectional view of the PDP taken on the Y—Y line. Only three cells are shown in these drawings for the sake of convenience, but in the real world a large number of cells are arranged in the PDP, each of which emits light in red (R), green (G) and blue (B).

This PDP is an AC-type surface discharge PDP. In this type of PDP, a discharge sparks inside the panel when pulse voltages are applied to the electrodes. The discharge causes phosphors that are applied on a back panel PA2 to emit visible light in the three colors, which in turn pass through the front surface of a front panel PA1.

The front panel PA1 is comprised of a front glass substrate 11, discharge electrodes 12 arranged in stripes on the front glass substrate 11, a dielectric glass layer 13 formed so as to cover the discharge electrodes 12, and a protective layer 14 formed so as to cover the dielectric glass layer 13. Each of the discharge electrodes 12 is made up of a transparent electrode **12*a* formed on the surface of the front glass substrate 11 and a metal electrode 12*b* formed on the transparent electrode 12*a***.

The back panel PA2 is made up of a back glass substrate 21, address electrodes 22, an electrode protective layer 23, barrier ribs 24, and phosphor layers 25. The address electrodes 22 are arranged in stripes on the back glass substrate 21. An electrode protective layer 23 is formed on the front glass substrate so as to cover the address electrodes 22, which protects the address electrodes 22 and has visible light reflected toward the front panel PA1. The barrier ribs 24 are formed on the electrode protective layer 23, each of which extends in the same direction as the address electrodes 22 and along the gaps among the address electrodes, and phosphor layers 25 are formed in the gaps between the adjacent barrier ribs 24.

The following is an overview of how to manufacture the above PDP.

Manufacturing the Front Panel PA1

The front panel PA1 is formed in the following way. First, the discharge electrodes 12 are formed in stripes on the surface of the front glass substrate 11 using a well-known chemical vaporization or photolithography method. Then, the dielectric glass layer 13 is formed from glass particles so as to cover the discharge electrodes 12. Finally, the MgO protective layer 14 is formed on the surface of the dielectric glass layer 13 by an electron beam deposition method.

Manufacturing the Back Panel PA2

The back panel PA2 is formed in the following way. First, the address electrodes 22 are formed on the back glass substrate 21 by a photolithography method. These address electrodes are metal electrodes. Then, the electrode protective layer 23 is formed so as to cover the address electrodes 22 as it is formed for the front panel PA1. Next, the barrier ribs made of glass 24 are arranged at a predetermined pitch on the electrode protective layer 23. Finally, the phosphor layers 25 are formed by applying red (R), green (G), and blue (B) phosphors to the gaps created between the adjacent barrier ribs 24. The following are R, G and B phosphors used in this embodiment. Other phosphors that have been conventionally used for PDPs may also be used.

Red phosphor: $(Y_xGd_{(1-x)})BO_3$: $Eu^{3+}$

Green phosphor: $Zn_2SiO_4$:Mn

Blue phosphor: $BaMgAl_{10}O_{17}$:$Eu^{2+}$ or $BaMgAl_{14}O_{23}$: $Eu^{2+}$

Bonding the Panels Together to Complete the PDP

The front panel PA1 and the back panel PA2 are bonded together, so that the discharge electrodes 12 and the address electrodes 22 cross at a right angle. Following this, discharge gas (for example helium/xenon or neon/xenon) is enclosed in discharge spaces 30 that are partitioned by the barrier ribs 24, at a specified pressure to complete the PDP.

Conventionally, helium/xenon or neon/xenon has been used as the discharge gas to be enclosed. To improve the luminance of each cell, the discharge gas includes at least 5 percent of xenon by volume and is introduced at a pressure of about $0.67\times10^5$ to $1.01\times10^5$ Pa.

Figure 7:
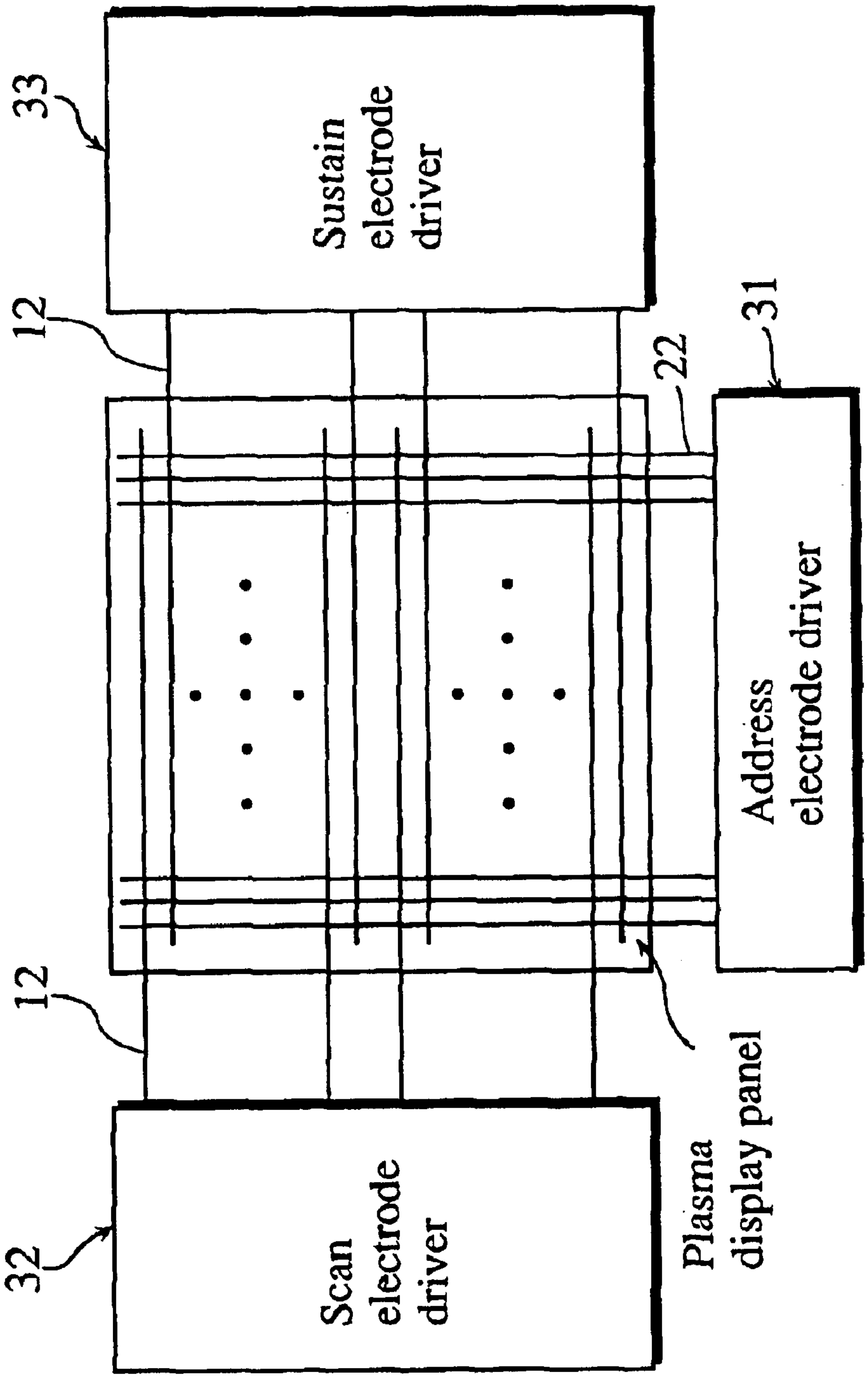
FIG. 7 is a block diagram showing a driving circuit of the PDP.
Figure 8:
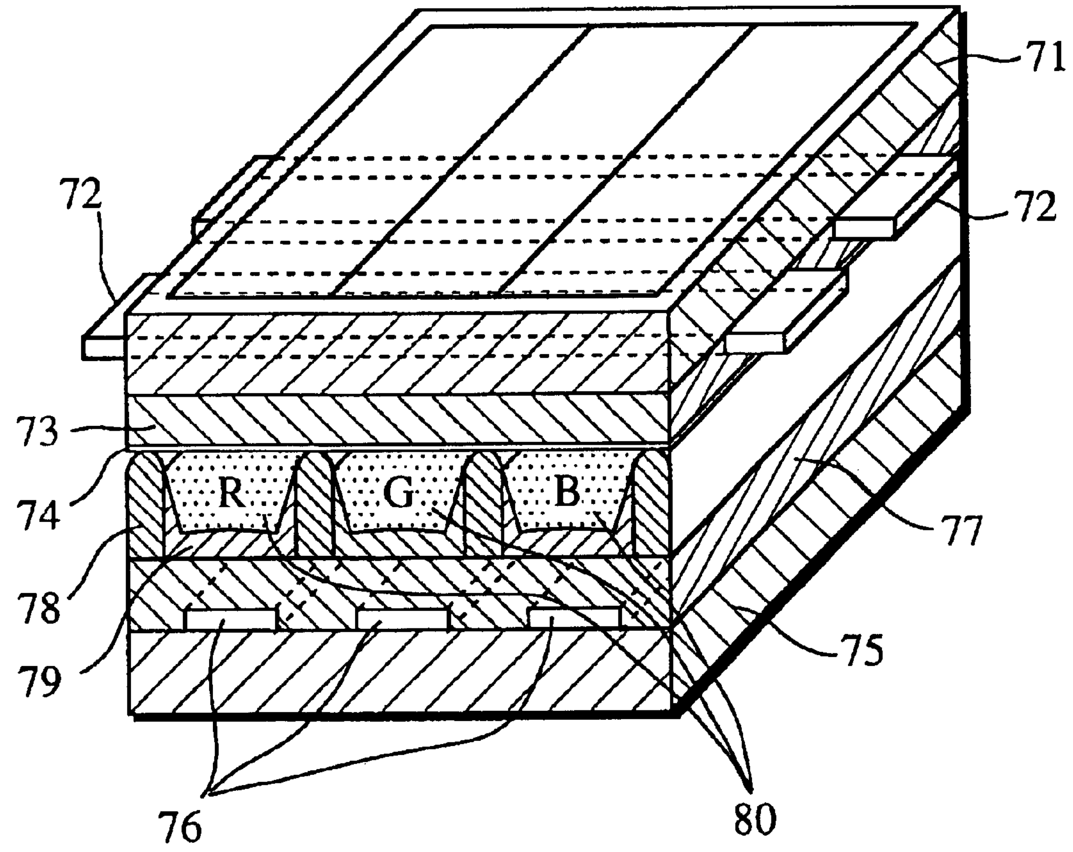
FIG. 8 is a perspective view showing an AC-type surface discharge PDP relating to the conventional embodiments.

To drive the PDP, a driving circuit shown in FIG. 7 is used. The address electrodes 22 are connected to an address electrode driver 31. The discharge electrodes 12 which serves as scan electrodes are connected to a scan electrode driver 32, and the discharge electrodes 12 which serve as sustain electrodes are connected to a sustain electrode driver 33. To make it easier for a set-up discharge to occur, the driving circuit in all cells of the PDP equally accumulates a wall charge. Following this, a write discharge occurs during an address period in cells to be lit. In a sustain period, the illumination of the cells to which data has been written in the address period are lit, and the illumination is kept until an erase period when the wall charge is erased to stop the illumination of the cells. These operations are repeatedly performed to produce an image display of one TV field period.

Forming the Dielectric Glass Layer

The dielectric glass layer 13 is formed from glass particles that have their surfaces melted and have a predetermined average diameter. A glass paste made from the glass particles is printed to the surface of the front glass substrate 11 on which the discharge electrodes 12 were formed, by any of a screen-printing method, a dye coating method, a spin coating method, a spray coating method, and a blade coating method. The glass paste is then fired to form the dielectric glass layer 13.

The dielectric glass layer formed from those glass particles has a fine structure, as a baked metal oxide. Also, fewer bubbles remain there.

Figure 4A:
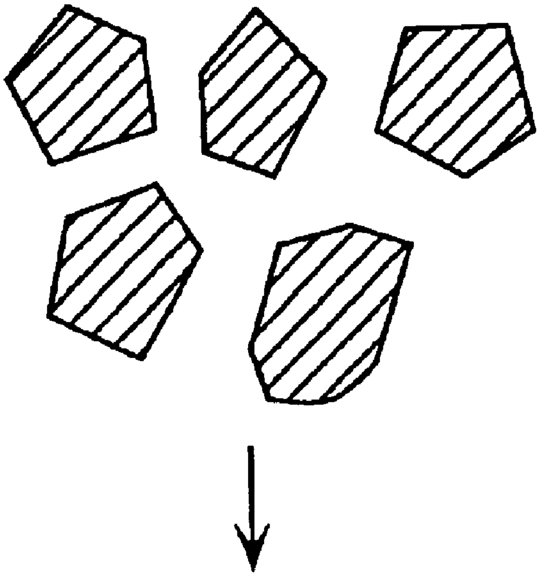
FIG. 4 shows sectional views of glass particles used for forming dielectric glass layers (a) and (b), (a) showing the glass particles before having their surfaces melted and (b) showing the glass particles after having their surfaces melted.
Figure 4B:
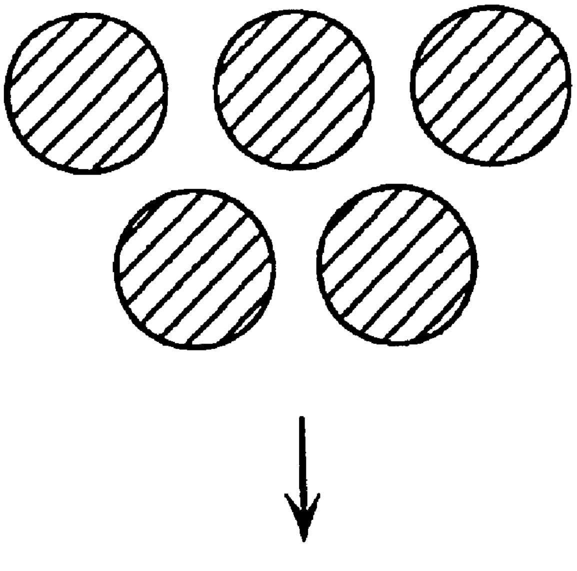

The glass particles being subjected to the melting are obtained by grinding a raw glass material of a specific composition with a grinding apparatus such as a ball mill and a jet mill (for example HJP300-02 manufactured by Sugino Machine, Ltd.), so that an average particle diameter will end up being closer to that of the particles used for forming a dielectric glass layer. The ground glass particles have irregular and angular forms as shown in FIG. 4(*a*).

When using the glass having the components G1, G2, G3, . . . , GN as the glass raw material, the components G1, G2, G3, . . . , GN are weighed according to the component ratio. They are then fired and melted in a furnace at 1300° C., and put into water, to form the dielectric glass material. A simple substance or a compound of the following substances can be used as the glass material: $PbO—B_2O_3—SiO_2—CaO$; $PbO—B_2O_3—SiO_2—MgO$; $PbO—B_2O_3—SiO_2—BaO$; $PbO—B_2O_3—SiO_2—MgO—Al_2O_3$; $PbO—B_2O_3—SiO_2—BaO—Al_2O_3$; $PbO—B_2O_3—SiO_2—CaO—Al_2O_3$; $Bi_2O_3—ZnO—B_2O_3—SiO_2—CaO$; $ZnO—B_2O_3—SiO_2—Al_2O_3—CaO$; $P_2O_5—ZnO—Al_2O_3—CaO$; and $Nb_2O_5—ZnO—B_2O_3—SiO_2—CaO$.

Other glass materials that have been conventionally used for forming a dielectric glass layer may also be used.

Figure 5:
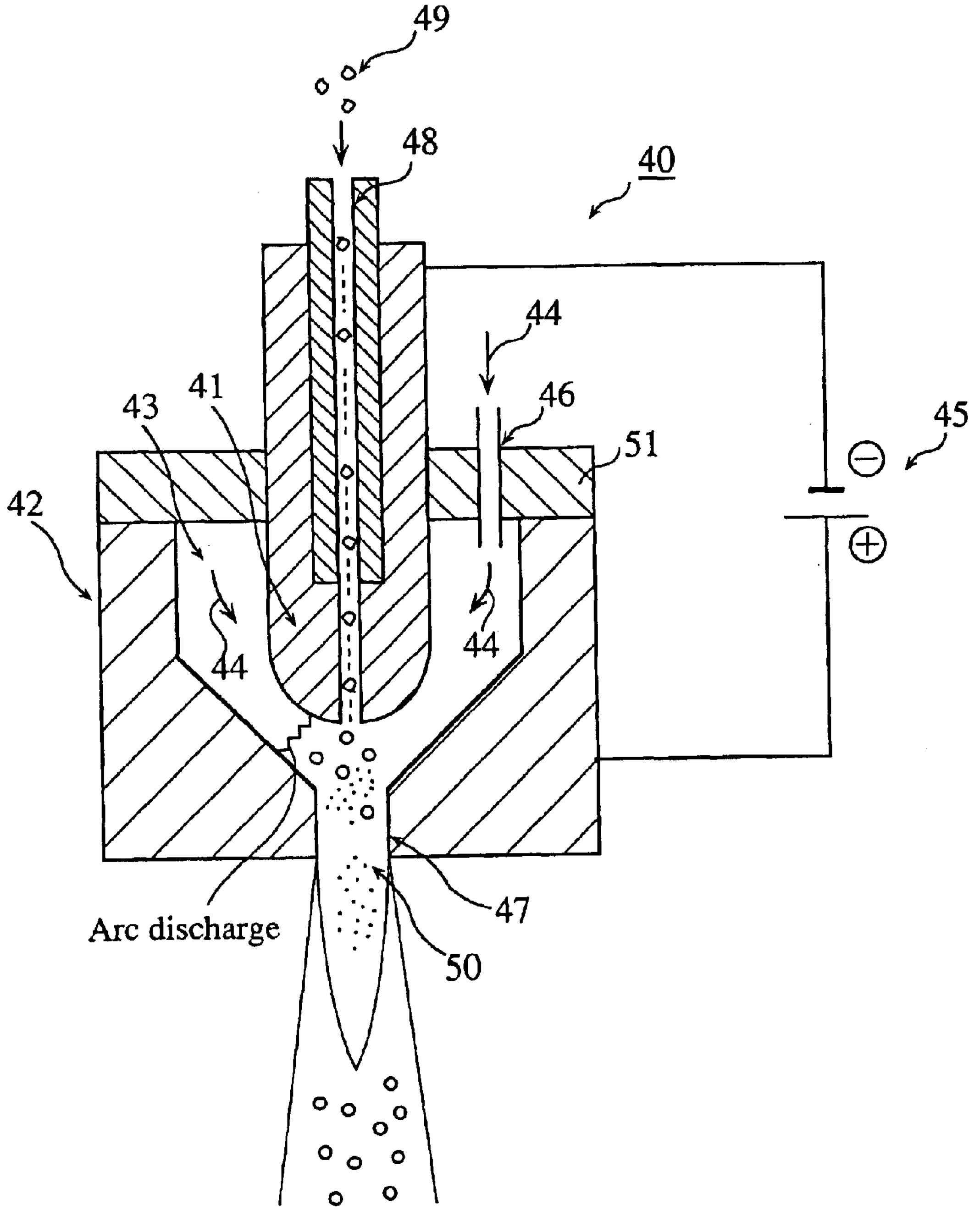
FIG. 5 is a sectional view showing a construction of a plasma blow-pipe, which processes glass particles for forming a dielectric glass layer.

Melting the surface of glass particles can be performed in a plasma blow-pipe 40 of FIG. 5.

The plasma blow-pipe 40, used for a plasma spraying method, has a cylindrical cathode 41 and a columnar anode 42. To generate an arc discharge, a discharge gas 44 is enclosed into a space 43 that is shaped in V in a sectional view and created between the anode 42 and the cathode 41. Then, a direct current passed from a direct current source 45 is applied through the anode 42 to the cathode 41. This makes the discharge gas 44 enclosed in the space 43 to cause an arc discharge. The discharge gas 44 comes down from a gas port 46 sitting on the upper side of the plasma blow-pipe, and is expelled from a nozzle 47 at a pressure which is determined by the flow of the discharge gas. As the discharge gas 44, argon, helium, nitrogen and hydrogen may be used. Although not shown in FIG. 5, both the cathode 41 and the anode 42 can be structurally cooled down in water. They are also insulated with an insulating material 51.

The cathode 41, which is extending vertically, has a port in it for providing glass particles 48. Through the port 48, glass particles 49 go down to the space 43. Once the glass particles 49 reach the space 43, they are included in the discharge gas 44, exposed to a plasma jet 50, heated and melted, and expelled from the nozzle 47 together with the plasma jet 50.

In the plasma blow-pipe 40, the glass particles are exposed to the plasma jet at 10,000° C., so that the surface of the particles melts down to change the shape of the particles into spheroids as shown in FIG. 4(*b*) (spheroidizing step). The plasma blow-pipe of the structure can increase the efficiency of the processing, because it enables the glass particles to stay in the plasma jet. The glass particles are put into the plasma blow-pipe from where the particles are drawn by the force of the plasma jet and are included in the plasma jet. This also helps enhance the efficiency. By contrast, in a plasma blow-pipe in which glass particles are ejected from near the outlet of the nozzle 47, the plasma jet blows out some of the glass particles. All the glass particles are less likely to stay in it. For this reason, it is difficult to perform the procedure efficiently using this type of plasma blow-pipe.

In using the plasma blow-pipe of FIG. 5, it is necessary to set the output of the plasma jet so as not to melt the glass particles too much. To do so, the discharge gas needs to be introduced 10 L/min while applying a plasma current of 300A. Under the condition, it is possible to melt the surface of more than 90 weight percent of the glass particles and convert each of them into a spheroid.

Following this, a classifying apparatus classifies and selects glass particles of a specified particle size. It is preferable to classify the particles so that particles classified have almost the same diameters, and that the particle size of them describes a sharp curve on a particle size distribution graph. It is more preferable that a maximum diameter of the classified glass particles is no greater than half the thickness of a fired layer, in order to form a thinner dielectric glass layer.

The present invention is not limited to use when melting the surface of glass particles using the plasma blow-pipe described in the present embodiment. It is possible to melt and spheroidize the surface of ground glass particles by firing them in a furnace at a temperature lower than the softening point of the glass particles. In this way, the same effects can be obtained as in the embodiment.

Using a ball mill, a disperse mill or a wet jet mill, the glass particles that have their surfaces melted are blended with a binder and a solvent to form a mixed glass paste. Both a simple substance and a mixture of acryl resins, ethyl cellulose or ethylene oxide can be used as a binder. As a solvent, both a simple substance and a mixture of terpineol, butyl carbitol acetate, or pentanediol can be used. Viscosity of the mixed glass paste can be changed according to the amount of the solvent, so as to attain a viscosity suitable for a method selected for forming a layer.

It is preferable to add a plasticizer and a surface-active agent (dispersant) to the mixed paste, if needed. After applying and drying the paste on the surface of a substrate, the plasticizer softens the glass paste and prevents the formation of a crack in a dielectric glass layer formed after firing. When the surface-active agent is added, particles of it adhere to the surface of the glass particles, so that the glass particles are well dispersed and the glass paste can be applied evenly. The use of surface-active agent is effective particularly for a method that uses a glass paste with a low viscosity, such as a dye coating method, a spray coating method, a spin coating method or a blade coating method.

It is preferable that the mixed paste includes 35 to 70 weight percent of glass particles, and 30 to 65 weight percent of a binder and other ingredients in which the binder should preferably account for 5 to 15 weight percent. It is also preferable to add 0.1 to 3.0 weight percent of a plasticizer or a surface-active agent (dispersant) to the binder and other ingredients.

As example surface-active agents (dispersants), the following anionic surface-active agents can be used: polycarbonic acids; sodium alkyldiphenyl ether sulfonate; alkyl phosphate; higher alcohol phosphate; polyoxyethylene ethylenediglycerine ester borate carboxylate; polyoxyethylene ester alkylsulfate; formalin naphthalenesulfonate; glycerol monooleate; sorbitan sesquoleate; and homogenol.

As example plasticizers, dibutyl phthalate, dioctyl phthalate, and glycerin can be used, either by itself or in combination with some of the others.

The mixed glass paste is then applied to the surface of the front glass substrate 11, on which the discharge electrodes 12 are formed, by a screen-printing method, a dye coating method, a spin coating method, a spray coating method, or a blade coating method. The mixed glass paste is dried and fired at a predetermined temperature (550 to 590° C.) to bake the glass particles in it. The temperature should preferably be as close to the softening point of the glass particles as possible, on condition that the baking of the glass can still be performed at the temperature. This is because when the mixed glass paste is fired at a temperature much higher than the softening point, the molten glass paste flows too well to react with the discharge electrodes, leading to the formation of bubbles.

The thinner a dielectric glass layer becomes, the more panel luminance improves and the more a discharge voltage falls. Therefore, it is preferable to form as thin dielectric glass layer as possible, so long as the withstanding voltage is maintained.

The following is a description of how to apply a mixed glass paste by screen-printing, which is one of the methods for applying the paste.

In the screen-printing, a mixed glass paste like the mixed paste mentioned above (whose viscosity is about 50,000 centipoises) is applied on a stainless mesh screen of a specified mesh size (for example, a 325-mesh screen), and is printed using a squeegee (printing step). The mixed glass paste is then dried to vaporize an organic solvent included in the paste, so that a hinder in it is dried and hardened (drying step). The printing step and the drying step are conducted once for each, to form a dielectric glass layer. The two processes are alternately repeated several times, until the dielectric glass layer grows to a specified thickness. The dielectric glass layer is baked at a temperature near the softening point (baking step). The printing, drying and baking steps are repeatedly performed in the same manner, and a dielectric glass lawyer is completed.

The following describes a method for forming the electrode protective layer 23.

The electrode protective layer 23 is formed on the address electrodes by the method used for forming the dielectric glass layer 13. The electrode protective layer 23 is formed from a substance, which is obtained by blending 5 to 30 weight percent of $TiO_2$ with the glass particles that were used for forming the dielectric glass layer 13. When $TiO_2$ is added, a dielectric glass layer formed on the surface of the back glass substrate will be able to reflect light emitted from phosphors toward the front panel. The more $TiO_2$ is added, the higher the reflectance of the dielectric glass layer becomes. If too much $TiO_2$ is added, however, it reduces a withstanding voltage of the dielectric glass layer. Therefore, $TiO_2$ may be added no greater than 30 weight percent of the entire dielectric glass particles.

The glass particles used here have also been subjected to the spheroidizing step and the classifying.

A dielectric glass layer formed from such glass particles can produce the following effects. Using the dielectric glass layer, a PDP that offers a high withstanding voltage can be realized.

The effect of the present invention will be described below with a reference to a schematic representation (a sectional view) of FIG. 6.

Prior to that, it would be good to describe effects of a conventional application method that uses particles without having the surface melted.

Figures 6A, 6B, 6C, 6D:
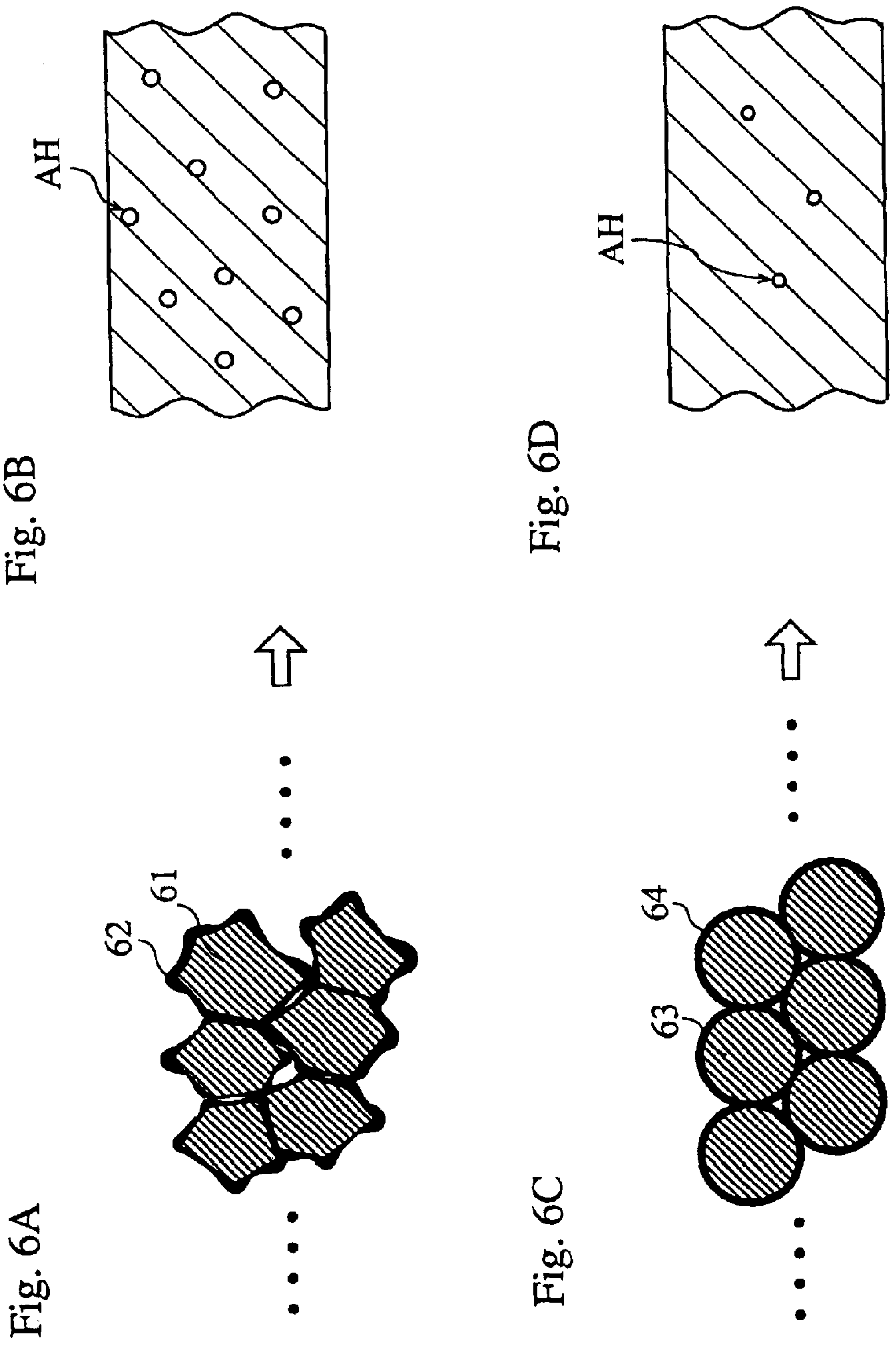
FIG. 6 shows sectional views describing the effects of the present invention, where (a) shows a dielectric glass layer formed from glass particles without having their surfaces melted, and (b) shows bubbles remaining in the dielectric glass layer of (a), while (c) shows a dielectric glass layer formed from glass particles with molten surfaces, and (d) shows a few bubbles remaining in the dielectric glass layer of (c)

FIG. 6 (*a*) shows glass particles obtained by grinding a raw glass material with a grinder. They were not subjected to the spheroidizing step. As can be seen, most of the glass particles are irregular and angular, so that the glass particles do not get wet evenly on the surface. Furthermore, the amount of a binder 62 that adheres to the surface of a glass particle 61 is different from place to place. This means that the binder is not baked at the same speed in any part of the surface, and that the binder does not burn out entirely before the burning temperature reaches the softening point of the glass particles. Some of the binders do not burn out until the glass particles start getting soft. As a result, gas generated by the burning is blocked the way out and stay in a formed dielectric glass layer in the form of bubbles. FIG. 6(*b*) shows these bubbles AH staying in the dielectric glass layer.

By contrast, as can be seen from FIG. 6(*c*), angularities of the glass particles are rounded off after the spheroidizing step, and the each particle is converted into a spheroidal form. The shape of the glass particle can get much closer to a sphere by the effect of surface tension of the plasma jet. Since all of those glass particles get wet evenly, a binder 64 also adheres evenly to the surface of the glass particles 63. This enables the binder 64 to burn at almost the same speed and burn out entirely before the burning temperature reaches the softening point of the glass particles. As a result, a possibility is lowered that the gas generated by the burning is blocked the way out from a formed dielectric glass layer. Also, the enclosed gas hardly remains in the dielectric glass layer in the form of bubbles. As is shown in FIG. 6(*d*), there remain fewer bubbles AH in the new dielectric glass layer than in the glass layer of FIG. 6(*b*).

The effect of the present invention is also affected by the glass particle size. The bubbles are less likely to emerge as the particle size distribution curve for a dielectric glass layer becomes sharp.

This is due to the fact that glass particles of a relatively smaller diameter melt faster than glass particles of a relatively larger diameter. In a glass paste that includes both relatively smaller and larger glass particles, the relatively smaller diameter glass particles melt down first by the end of the baking step. The molten glass particles flows so well that they tend to concentrate and block the way out for a gas generated from burning a binder that remains between the relatively larger diameter glass particles if the larger diameter glass particles have not burned out yet. Because of the difference in the melting speed between glass particles of a relatively smaller diameter and glass particles of a relatively larger diameter, bubbles emerge in gaps between the relatively larger glass particles that have not melted down yet. In sum, there is a close relationship between the glass particle diameter and bubbles to be generated, and the glass particle diameter is a critical factor in determining the number of the bubbles.

Set of Tests

Several PDPs were manufactured in accordance with the method described in the embodiment given above and used for a test to examine characteristics of dielectric glass layers in the PDPs. The dielectric glass layers were formed from glass particles $PbO—Al_2O_3—SiO_2$. The glass particles had been subjected to the spheroidizing step under the following condition, and only the particles having a diameter of no greater than 5 μm had been sorted out.

Gas for activating plasma; argon

Gas flow; 10 L/min

Current applied to between the anode and the cathode; 300A

In applying a dielectric glass paste, ethyl cellulose was used as a binder, and α-terpineol as a solvent. Glass particles, the binder (resins) and the solvent are roughly in the ratio of 65%, 3% and 32% (by weight). The glass paste was baked twice to form a dielectric glass layer of 40 μm thick.

For the sake of comparison, a panel was manufactured where a dielectric glass layer on the front panel was formed from glass particles that were subjected to the spheroidizing step.

For each of the panels, the number of bubbles that emerged in each of the dielectric glass layer was calculated per 300 $cm^2$. The calculation was carried out under a light microscope with 100 magnifications.

Also, a test was performed to measure a withstanding voltage of the dielectric glass layers. Before starting the test, the front panels of the PDPs were removed, and a silver paste was applied to the surface of the dielectric layers. After drying the silver paste, a direct voltage was applied. The silver paste was used as a cathode, and the discharge electrode as an anode. Here, the withstanding voltage refers to a voltage at which a dielectric breakdown occurs in the layers.

The results of the test are shown below in Table 1.

TABLE 1

| | Bubbles (number/$cm^2$) | Breakdown voltage (V/μm) |
|---|---|---|
| PDP relating to this embodiment | 2 | 170 (V/μm) |
| Comparative example | 10 | 130 (V/μm) |

As can be seen from Table 1, only two bubbles were observed in the dielectric glass layer of the PDP relating to this embodiment (showing a contrast to ten bubbles in the dielectric glass layer of the comparative example). The breakdown voltage for the former was 170 V/μm, higher than that for the latter of 130 V/μm.

Second Embodiment

The PDP of the present embodiment is similar to the PDP of the first embodiment, but has a different process for spheroidizing glass particles to form a dielectric glass layer.

In this embodiment, a dry jet mill (for example, a counter jet mill AGF type manufactured by Alpine) is used to grind glass particles much smaller and convert them into spheroids (spheroidizing step).

In more detail, there are two high-speed flows flowing in the dry jet mill, and the dielectric glass particles are put in the flows and ground by the effect of the collision of them. When the two flows collide with each other, the glass particles also collide with one another. This makes the particles smaller to attain much the same particle diameter. The particle size distribution of them therefore describes a sharp curve.

In this method, the glass particles included in the two high-speed flows are ground, polished on the surface, and converted into spheroids in the wake of the collision. Such a change was observed under a microscope. It was also confirmed that a wet jet mill can of course grind glass particles, but do not grind them so small as to make them spheroidal as seen in the present embodiment. Therefore, there is a meaning to use the dry jet mill that can spheroidize glass particles by the effect of the collision of the high-speed flows.

In a dielectric glass layer formed from dielectric glass particles, which have their surfaces melted, a binder that adheres on and between the glass particles burns at almost the same speed in any part of the surface, and burns out before the burning temperature reaches the softening point of the glass particles. There is a scarce possibility that the gas generated by the burning is blocked the way out from the dielectric glass layer, and that the gas remains in the dielectric glass layer in the form of bubbles. In the dielectric glass layer, there was a decrease in the number of bubbles.

In this way, glass particles are ground to be smaller in diameter, with a particle size distribution for the glass particles describing a sharp curve. Accordingly, the number of bubbles remaining in a dielectric glass layer to be produced can be further reduced, because of the following two reasons. First, smaller diameter glass particles can be filled closer together in a dielectric layer than larger diameter glass particles, narrowing the gaps between the particles. Secondly, glass particles can burn at almost the same speed if the glass particle size describes a sharp curve.

If the particles get too small, however, the glass particles tend to cohere in a glass paste, leading to the formation of a greater number of bubbles in a formed dielectric glass layer.

Modifications to the First and Second Embodiments

The above embodiments describe the case where the glass paste including the dielectric glass particles, the binder and other ingredients is applied and fired to form the dielectric glass layer. However, the invention may be modified so that a dielectric glass sheet, being formed beforehand, is placed on the substrate on which electrodes are formed.

This dielectric glass sheet is obtained by blending a dielectric glass material with a thermoplastic resin and an organic solvent by a conventional method such as a blade method.

Using such a dielectric glass sheet, a thinner dielectric glass layer can be achieved.

INDUSTRIAL APPLICABILITY

The manufacturing method of the present invention is suitable for producing a PDP that offers a high withstanding voltage.

What is claimed is:

1. A manufacturing method for a plasma display panel by which electrodes are formed on a surface of a substrate in a first process and a dielectric glass layer is formed on the electrodes in a second process, the second process comprising:

a grinding step for grinding a dielectric glass material;

a spheroidizing step for converting each particle of the ground dielectric glass material into a spheroidal form;

an applying step for applying a mixture of the spheroidal dielectric glass particles and a binder, as a layer, to the surface of the substrate on which the electrodes are formed; and a firing step for firing the layer to remove the binder from the layer, thereby forming a dielectric glass layer.

2. The manufacturing method of claim 1, wherein the spheroidizing step is performed by melting the surface of particles of the ground dielectric glass material.

3. The manufacturing method of claim 2, wherein the melting is performed by putting the particles of the ground dielectric glass material into a plasma jet.

4. The manufacturing method of claim 2, wherein the melting is performed by exposing the particles of the ground dielectric glass material to an atmosphere at a temperature no higher than the softening point of the particles.

5. The manufacturing method of claim 1, wherein the spheroidizing step is performed by having the particles of the glass material collide with one another in high-speed gas flows.

6. The manufacturing method of claim 1, wherein the second process further comprises a step of classifying the glass particles, which is performed between the spheroidizing step and the applying step, so that a maximum diameter of the spheroidal particles of the dielectric glass material does not exceed a half thickness of the dielectric glass layer after the firing step.

7. The manufacturing method of claim 1, wherein the applying step is performed by placing a dielectric glass sheet on the surface of the substrate, the dielectric glass sheet being obtained by mixing the spheroidal glass particles with a thermoplastic resin.

8. The manufacturing method of claim 1, wherein in the firing step, the firing is performed at a temperature in a range of 550° C. to 590° C.

9. The manufacturing method of claim 2, wherein in the spheroidizing step, the spheroidizing is performed until a surface of more than 90 weight percent of the ground dielectric glass material is melted.

10. A manufacturing method for a plasma display panel by which electrodes are formed on a surface of a substrate in a first process and a dielectric glass layer of a predetermined thickness is formed on the electrodes in a second process, the second process comprising:

a grinding step for grinding a dielectric glass material selected from a group consisting of $PbO—B_2O_3—SiO_2—CaO$; $PbO—B_2O_3—SiO_2—MgO$; $PbO—B_2O_3—SiO_2—BaO$; $PbO—B_2O_3—SiO_2—MgO—Al_2O_3$; $PbO—B_2O_3—SiO_2—BaO—Al_2O_3$; $PbO—B_2O_3—SiO_2—CaO—Al_2O_3$; $ZnO—B_2O_3—SiO_2—Al_2O_3—CaO$; $P_2O_5—ZnO—Al_2O_3—CaO$; and $Nb_2O_5—ZnO—B_2O_3—SiO_2—CaO$;

a spheroidizing step for converting the ground dielectric glass material into spheroidal particles;

a selecting step for selecting a maximum diameter of the spheroidal particles to not exceed one half the thickness of the predetermined dielectric glass layer;

an applying step for applying a mixture of the selected spheroidal particles and a binder, as a layer, to the surface of the substrate on which the electrodes are formed; and a firing step for firing the layer to uniformly remove the binder from the layer, thereby forming a dielectric glass layer of the predetermined thickness.

11. The manufacturing method of claim 10, wherein the spheroidizing step is performed by melting the surface of more than 90 weight percent of the glass particles of the ground dielectric glass material.

12. The manufacturing method of claim 11, wherein the melting is performed by putting the particles of the ground dielectric glass material into a plasma jet having a discharge gas of 10 L/minute and a plasma current of 300A.

13. The manufacturing method of claim 12, wherein a firing step temperature is set to enable the binder to burn out before the glass particles reach the softening point to suppress the number of bubbles in the dielectric glass layer.

* * * * *